Jan. 14, 1964 T. H. MARTLAND 3,117,534
CONVERTIBLE CLASSROOM FURNITURE
Filed May 15, 1962
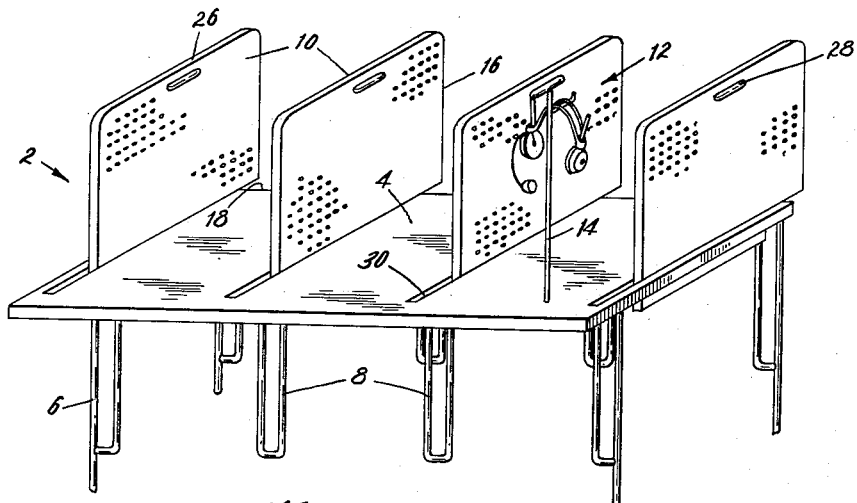
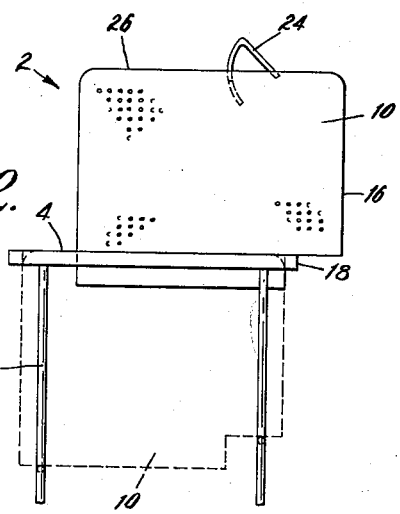
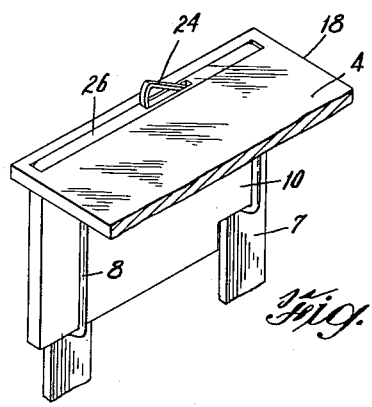
INVENTOR.
THEODORE H. MARTLAND
BY
AGENT

United States Patent Office 3,117,534
Patented Jan. 14, 1964

3,117,534
CONVERTIBLE CLASSROOM FURNITURE
Theodore H. Martland, Dobbs Ferry, N.Y.
Filed May 15, 1962, Ser. No. 194,926
7 Claims. (Cl. 108—60)

This present invention is a continuation-in-part of my copending patent application Serial No. 94,883, filed on March 10, 1961, and it relates to an improved multi-purpose classroom furniture for use in language teaching and, more particularly, it relates to improved student laboratory stations readily and simply convertible to normal classroom use.

A major change in the teaching of languages, particularly foreign languages, has occurred in recent years. The customary oral lecture and demonstration by the instructor, and the oral recitation by the student before the whole class, has given way to the use of electronic classrooms, and this technique of teaching is likely to be extended to the teaching of subjects other than languages, for example, shorthand dictation practice, speech, etc. Such an electronic classroom is equipped with earphones and microphones for a large number of students, and a master control panel including at least one tape recorder.

If, for example, the master control panel has a phonograph and two tape recorders, the instructor may have one, two or three lessons playing to a corresponding number of groups at one time, and may listen to or record any student to test or determine his progress. A lesson may be prerecorded with suitable pauses to permit the listening student to repeat a phrase or to answer using his own individual microphone, and his reply may be recorded. The student may play back the lesson and listen to it and his answer, in his own individual earphones, thereby permitting him to compare his pronunciation with that of the teacher or of another person skilled in the particular language. The time of each student is thus utilized more effectively, as he does not have to await his turn to recite nor is he misled by the errors of his classmates.

Language training classrooms have customarily used long tables accommodating a number of students, but divided into individual stations or booths, each student being "insulated" from his neighbors by fixed, stationary acoustic partitions. While this equipment has been effective, the classroom is useful only for this specific type of instruction. This inflexibility in the utility of the classroom is a decided disadvantage, and becomes an economic hardship for schools having an enrollment too small to make full time use for language instruction. It is most desirable that the classroom be useful for other types of instructional activities, for example, films, discussions, examinations, etc.

The aforementioned copending application discloses and claims an invention which provides for a novel furniture which may be readily and simply converted to and from use in language instruction or normal classroom uses. In accordance with this invention, a student table accommodating a plurality of students is provided with a plurality of vertical, rotatable acoustical panels which, in a first or up position divide the table into a plurality of pupil stations acoustically insulated from each other, and in a second or down position, provide a student table or desk suitable for normal classroom use.

However, the structural features of the vertical, rotatable, acoustical panels possess certain attendant disadvantages, as more fully described hereinbelow.

As disclosed in the aforementioned copending application, it is desirable that the acoustical "booth," formed by any two adjoining panels, extend beyond the forward edge of the table or desk, so as to include the student's head without requiring the student to lean forward in an awkward and uncomfortable position. It is also desirable that the panels, when in the downward position, do not extend into the chair area of the student but remain positioned in substantial alignment with the vertical plane formed by the inward edge of the table with the floor. It is, finally, often desirable that the retractable panels be capable of forming a continuous surface with the surface of the table, when in the downward position, in order to allow the desk to be used not only as a group of individual desks but as one single oversized table.

It is readily seen that if the panels are pivotable and rotatable components, such as described and claimed in the copending application, not all of the aforementioned advantages or desirable features are obtainable. Thus, for example, if the panel rotates more than 90 degrees so as to ensure complete privacy in the "booth," then, when in the downward position, the panel will either interfere with the chair area of the student or interfere oftentimes awkwardly with the surface of the desk, and, conversely, if both smoothness of desk surface and freedom of chair area are to be achieved, then the panel must, vi maiore, be rotatable to only 90 degrees, thus compelling the pupil to lean forward for complete "booth" privacy.

It is, therefore, the main object of the present invention to provide for an improved classroom furniture readily and easily convertible to and from use as a conventional classroom table or desk and as a language laboratory unit or teaching laboratory station.

Other objects and advantages of the present invention will be readily apparent from the detailed description of the invention set forth hereinbelow and from the accompanying drawings in which:

FIGURE 1 is a perspective view of one embodiment of this invention;

FIGURE 2 is another view of the same embodiment shown in FIGURE 1; and

FIGURE 3 is a perspective sectional view showing alternative features of the invention.

As shown in FIGURE 1, the language instruction table 2 includes an elongated, preferably horizontal top or work surface 4 appropriately supported by legs which may be either manufactured from metal, preferably tubularly-shaped metal as shown at 6, or from wood as shown at 7 (FIGURE 3). The supporting legs should be so positioned so as not to interfere with the raising and lowering of the vertical acoustical panels 10, and this is most efficiently achieved by employing tubular supporting legs shaped, for example, as shown in FIGURE 1, or encompassing modifications thereof, to contain and simultaneously offer additional support to the panels.

The plurality of movable panels 10 may be thought of as a plurality of dividers which in their raised position divide the table 2 into a plurality of pupil stations, for example, six pupil stations. Each pupil station is preferably provided with a suitable microphone and earphone headset 12 which may be hung from a suitable hanger 14

(only one such headset and hanger being shown) and appropriately wired to connect with the instruction equipment. If desired, a drawer, shelf or other supply storage facilities may be positioned under the work surface, as long as the movement of the acoustical divider is unaffected.

As clearly shown in FIGURE 2, the acoustical panels or dividers 10 are substantially rectangularly shaped and are constructed that, when in the raised position, their frontal vertical edge 16 extends past the inward edge 18 of the table surface 4. This embodiment extends the acoustical "booth" to include the student's head without requiring the pupil to lean forward in an awkward or uncomfortable position.

The motion of the divider may be readily visualized as a two-step operation. Specifically, from its downward position, indicated by the dotted lines in FIGURE 2, the panel is first raised vertically and subsequently slided horizontally toward the student to a self-locking or lockable position. The means suitable to accomplish the entire operation are well known in the art and need not be elaborated upon. They may be either manually operated, if economy is to be stressed, or they may be electro-mechanically controlled by either the student himself or by the supervising instructor.

There are well-known mechanical devices which cause the panel to become self-locked when slided horizontally to its final resting position. For example, a device similar to the self-locking peg used in collapsible tables or chairs may be employed. This particular feature of the invention is not deemed unobvious and inventive. Another easily derivable manner of preventing the panel from collapsing when in the upright position comprises the addition of a C-shaped bracket to the lower horizontal edge of the panel, which bracket would engage the tubular supporting means, which, therefore, would be supporting the panel both in the upright and in the downward positions.

The downward position of the panels may be such that the desk surface 4 is substantially smooth and uniform throughout, and this is generally preferable, in which case, as shown in FIGURE 3, there may be provided in each panel a handle 24, which, when not in use, is completely recessed within edge 26 of the panel.

If it is desired to retain the desk surface subdivided into a plurality of individual work-areas, the panels need not be fully retractable within the surface of the table, but may be lowered only a certain distance, for example, their upper horizontal edge 26 may rest protruding only 1 to 3 inches above the desk surface. In this case, there is no need for handles 24 but simple economical means, such as finger-holds (FIGURE 1), are sufficient to operate the panel.

The vertical movement of the panels is effected by providing within the surface of the desk a plurality of slots 30 within which the panels slide. The height of the "booth" panels may be varied to conform with the physical characteristics of the students, by employing in each particular laboratory unit a set of panels, specifically manufactured with respect to their height.

It will be noted that acoustical panels are provided on each side of the student only, and not in front of him. Omission of the acoustical barrier at the front of each station is facilitated by the use of earphone-microphone headsets. This structure permits the instructor and the student to see each other, and also facilitates use of the table for normal classroom purposes when the acoustical divider is rotated downward into its inoperative position. The student is enabled to observe the entire room, including chalkboards on the side walls. The microphone and earphone headsets are out of the way, but remain in sight of the instructor. This effectively discourages the student from tampering with this expensive equipment.

When in the downward position, panels 10 are prevented from collapsing by means of U-shaped supports 8 as shown in FIGURE 1. Other means of support may comprise, for example, a lip fixedly connected (not shown) to edge 26 and resting on surface 4 of the work table. However, it is evident that this latter arrangement may not be employed when panels 10 are desired to be lowered to a non-flush position in which case the lip should be located at the desired distance from the edge 26.

Since certain changes may be made in the above product and article without departing from the scope of the invention herein involved, it is intended that all matter contained in the above description or shown in the accompanying drawing shall be interpreted as illustrative and not in a limiting sense.

What is claimed is:

1. An improved multi-purpose article of classroom furniture comprising a work surface having a long dimension, a plurality of vertical acoustical panels positioned within openings in said work surface located transverse thereto, each of said vertical acoustical panels being substantially rectangularly shaped and capable of being raised and lowered from a supported position within said openings and firmly secured into an upward position, so as to divide said long dimension of said work surface into a plurality of pupil stations, by a horizontal sliding motion along said transverse openings and retaining means for retaining the rearward, lower portions of said vertical acoustical panels within said openings while in the raised position.

2. An article of class room furniture as defined in claim 1, wherein the horizontal upper edge of said acoustical panel is supported coplanarly flush with said work surface when in the downward position.

3. An article of classroom furniture as defined in claim 1, wherein the horizontal upper edge of said acoustical panel is supported protruding from said work surface, when in the downward position, so as to subdivide said work surface into a plurality of pupil desks.

4. An improved multi-purpose article of classroom furniture as defined in claim 1, wherein the supporting means for said acoustical panel, when in the downward position, is a U-shaped tubular element.

5. An improved multi-purpose article of classroom furniture as defined in claim 1, wherein the supporting means for said acoustical panels, when in the downward position, are a U-shaped tubular element for the inner panels and a substantially Y-shaped tubular element for the outer panels, one component of said Y-shaped element forming a support for the work surface itself.

6. An improved multi-purpose article of classroom furniture comprising a work surface having a long dimension, a plurality of vertical acoustical panels positioned within openings in said work surface located transverse thereto, each of said panels being substantially rectangularly shaped and capable of being raised within said opening and firmly secured into an upward position by a horizontal sliding motion along said transverse openings, so as to divide said long dimension of said work surface into a plurality of pupil stations, said panels being supported, when in the downward position, flush with said work surface by at least one U-shaped tubular element and the outer panels of said article of furniture being supported, when in the downward position, by a pair of substantially Y-shaped tubular elements, said elements constituting the support of the work surface and retaining means for retaining said vertical acoustical panels within said openings while in the raised position.

7. An article of classroom furniture comprising a work surface having a long dimension, a plurality of vertical acoustical panels positioned within transverse openings in said work surface, each of said vertical acoustical panels being substantially rectangularly shaped with the lower forward end thereof being recessed to provide a horizontal supporting surface, said vertical acoustical panels being adapted to be raised from a lowered supporting position within said openings and firmly secured into an upward position by a horizontal sliding motion within said openings towards the student side of said work surface with the forward end of the panels extending beyond the edge of said work surface and said horizontal supporting surface engaging and being supported by said edge so as to divide said work surface into a plurality of pupil stations, and retaining means for retaining the rearward lower portions of said vertical acoustical panels within said openings while in the raised position.

References Cited in the file of this patent

UNITED STATES PATENTS

| | | |
|---|---|---|
| 1,138,974 | Ramsey | May 11, 1915 |
| 1,246,606 | Kane | Nov. 13, 1917 |
| 1,563,381 | Larmore | Dec. 1, 1925 |
| 1,992,903 | Potashnik | Feb. 26, 1935 |
| 2,207,515 | Hheglin | July 9, 1940 |
| 2,388,353 | Watson | Nov. 6, 1945 |
| 2,676,858 | Duncan | Apr. 27, 1954 |
| 2,688,525 | Lindstrom | Sept. 7, 1954 |
| 2,694,614 | Dent | Nov. 16, 1954 |
| 2,944,861 | Lessin | July 12, 1960 |
| 2,970,874 | Honeycutt et al. | Feb. 7, 1961 |